United States Patent
Dorsey et al.

(10) Patent No.: US 6,198,751 B1
(45) Date of Patent: *Mar. 6, 2001

(54) MULTI-PROTOCOL PACKET TRANSLATOR

(75) Inventors: Paul C. Dorsey, Merrimack, NH (US); Kevin M. Frazier, Reading, MA (US); Peter DeCarolis, Wells, ME (US)

(73) Assignee: Cabletron Systems, Inc., Rochester, NH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,632

(22) Filed: Nov. 19, 1997

(51) Int. Cl.[7] ...................................................... H04J 3/16
(52) U.S. Cl. ........................... 370/466; 370/464; 370/349
(58) Field of Search ................................. 370/466, 467, 370/413, 349, 354, 355; 395/200.6, 200.61, 200.62; 704/249

(56) References Cited

U.S. PATENT DOCUMENTS

| | | | |
|---|---|---|---|
| 5,117,429 | * 5/1992 | Lagoutte | 370/413 |
| 5,651,002 | * 7/1997 | Van Seters | 370/401 |
| 5,655,140 | 8/1997 | Haddock . | |
| 5,717,910 | * 2/1998 | Henry | 395/568 |
| 5,787,255 | * 7/1998 | Parlan | 370/349 |
| 5,812,792 | * 9/1998 | Haddock | 709/204 |
| 5,832,236 | * 11/1998 | Lee | 709/204 |

FOREIGN PATENT DOCUMENTS 0 289 248    11/1988   (EP) .

OTHER PUBLICATIONS

A.S. Krishnakumar, et al., The Programmable Protocol VLSI Engine (Prove), Jun. 14, 1992, Supercomm, ICC '92.
A.S. Krishnakumar, et al., VLSI Implementations of Communication Protocols—A Survey, Sep. 1989, IEEE Journal on Selected Areas in Communications.
Matthias Kaiserswerth, The Parallel Protocol Engine, Dec. 1993, IEEE/ACM Transactions on Networking.
Patent Specification, P.2, L. 14–25.

* cited by examiner

Primary Examiner—Douglas W. Olms
Assistant Examiner—Ricardo M. Pizarro
(74) Attorney, Agent, or Firm—Wolf, Greenfield & Sacks, P.C.

(57) ABSTRACT

A multi-protocol packet translator is disclosed. The translator may have microcoded control to translate a packet from one protocol to another. The microcoded instructions may be fed through a pipeline to control reading of information from information sources (including the original packet) and selectively connecting those sources to an output memory.

18 Claims, 17 Drawing Sheets

MULTI-PROTOCOL PACKET TRANSLATOR

FIELD OF THE INVENTION

This invention relates to communication networks, and more particularly, to apparatus and methods for translating information packets from one network protocol to another network protocol.

DISCUSSION OF THE RELATED ART

Computer communication networks have proliferated in order to enable the sharing of computer resources over a computer network. A network for permitting communication may be referred to as a local area network or "LAN." LAN refers to an interconnection data network that is usually confined to a moderately sized geographical area, such as a single office building or a campus area. Larger networks are often referred to as wide area networks or "WANs."

Networks may be formed using a variety of different interconnection elements, such as unshielded twisted pair cables, shielded twisted pair cables, coaxial cable, fiber optic cable, or even wireless interconnect elements. The configuration of these cabling elements can follow one (or more) of many topologies, such as star, ring or bus.

In addition, a number of different protocols for accessing the networking medium have evolved. Examples of various network protocols include FDDI, Ethernet (and multiple Ethernet communication protocols), ATM, token ring (and multiple token ring communication protocols) and ISDN. One particularly attractive communication network is described in U.S. Pat. No. 5,485,455, issued Jan. 16, 1996.

The total number of installed communication networks has grown explosively. The number of communication protocols also continues to expand. Consequently, there are a great number of installed networks, many using different protocols. As the number of networks and network protocols has expanded, so has the desire to expand the scope of network coverage. The result is a desire to send packets from networks using one communication protocol to networks using other communication protocols.

A communication within a network is referred to as a "packet" ("packet" and "data packet" are intended to include traditional data packets and any functional equivalent, whether referred to in the art as "cells," "datagrams," or the like). A packet intended for use with one protocol cannot necessarily be used in a network that follows a different protocol. Accordingly, some form of translation is required when sending packets between networks that follow different communication protocols.

FIG. 1 illustrates an example of a prior art connection between networks. The first network 10 forwards communications within the network 10 according to one communication protocol. The second network 11 forwards communication packets around the network 11 using a different communication protocol. Accordingly, if a packet needs to be sent from the first network 10 to the second network 11, a translation needs to be made. According to the prior art, a translation unit 12 is included for translating packets from the communication protocol of the first network 10 to the communication protocol of the second network 11, and vice versa.

For design of the translator 12, the prior art follows one of two approaches. In the first approach, a general purpose computer processor is used to do the translations. The processor generally stores the packet in memory, manipulates the packet within that memory to conform to the new protocol and then outputs the translated packet.

The second approach is to design a custom hardware machine to perform the translation. For this solution, a state machine is hard coded to perform each translation from one format to the other. In the event that the translator 12 must translate from multiple formats to multiple formats, a fast hard coded translator must be designed and implemented for each translation. While common parts of similar translations may be combined to decrease circuitry, this adds significantly to the complexity of hardware verification. The hard coded state machine is usually implemented on an application specific integrated circuit (ASIC) or using a programmable logic device (PLD, such as field programmable gate arrays or complex programmable logic devices).

SUMMARY OF THE INVENTION

According to one embodiment of the present invention a translator unit is disclosed for translating a packet from one communication protocol to a second communication protocol. In this embodiment, the translator unit comprises an input memory, an information source, an output memory, and a connection circuit that selectively connects the input memory and the information source to the output memory, to selectively write information into the output memory according to the second communication protocol's format. The translator unit also includes a microcoded control unit coupled to the connection circuit. In this embodiment, the microcoded control unit may include a pipeline unit coupled to the connection circuit.

According to another embodiment of the present invention, a pipeline control unit for reading data is disclosed. The control unit includes a first memory having a first read latency, a second memory having a second read latency, longer than the first read latency, a pipeline unit having a first stage and a second stage, and a circuit that initiates read cycles from the first memory based on a first instruction in the second stage of the pipeline and which initiates read cycles from the second memory based on a second instruction in the first stage of the pipeline.

According to another embodiment of the present invention, a method of translating a packet is disclosed. According to this embodiment, a first memory is loaded with a set of microcode instructions, each set being designed to perform a different network communication protocol translation. The method also includes the steps of receiving an original packet to be translated, selecting one of the sets of the microcode instructions based on the first protocol and the second protocol, and translating the original packet by executing the selected set of microcode instructions.

According to another embodiment of the present invention, a method of translating an original packet into a translated packet is disclosed. According to this method, an instruction memory is loaded with a set of instructions. The original packet is placed into an input memory. An information source is provided and an output memory to store the translated packets is provided. The input memory and the information source are sequentially and selectively connected to the output memory, based on the instructions.

DETAILED DESCRIPTION OF THE INVENTION

While the use of general purpose processors to perform translations is flexible, the system cannot be optimized for performing packet translation. Accordingly, a processor based system may not be able to meet the performance requirements for fast networks or when there is a lot of traffic through the translator.

Figure 1:
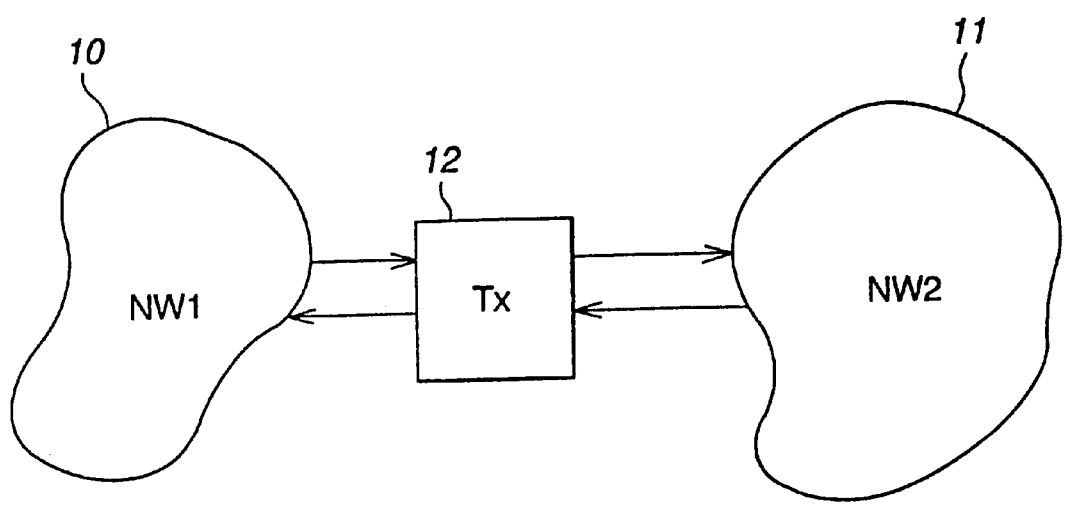
FIG. 1 illustrates a prior art setting for translation of packets between two communication networks.

The alternative, hard coded state machines, can be quite expensive. In addition, they are inflexible. If any change is required, a new design must be made. This is a significant problem because communication protocols change frequently and new protocols are promulgated with some frequency. Moreover, the designs typically are difficult to modify to apply in new environments or where additional translations need to be performed by the translator 12 of FIG. 1.

One or more embodiments of the present invention achieve a variety of advantages over these prior art systems. Certain embodiments of the present invention can achieve one or more of the following goals: the embodiment is fast, being equivalent or close to speed to a custom hardware based translation; real time processor intervention that would slow down translation is unnecessary; the translator can be adapted to perform new translations without extensive new development; the design is flexible and can be configured for multiple protocol translations; the translator is field upgradable (i.e., mistakes or new translations can be addressed with a field upgrade); the implementation is compact; and the translator is scalable—capable of performing trade-offs between speed and complexity.

Figure 2:
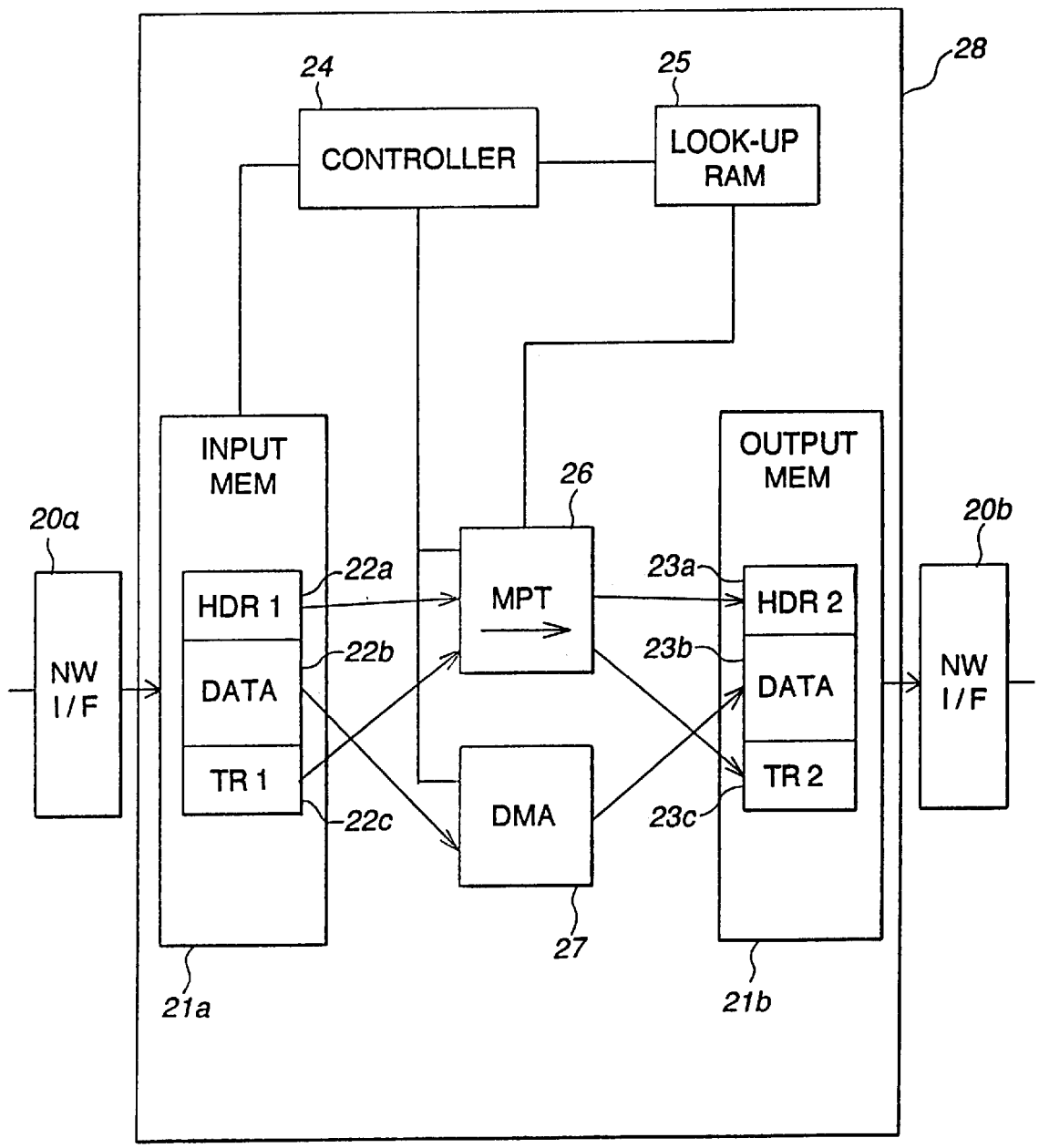
FIG. 2 illustrates one embodiment of a translator unit according to the present invention.

FIG. 2 illustrates a simplex translator 28 according to one embodiment of the present invention. In a simplex translator, packets are translated in only one direction. Thus, a packet would be received from a first network on the network interface 20a, translated by the translator 28, and output to a second network by network interface 20b. The network interfaces 20a, 20b may be of the same form commonly used in the art to receive and send data packets to/from a network. For example, the network interface may be part of known packet switches, routers, bridges or just a physical port with associated hardware.

Data packets according to most protocols are in the general format illustrated at 22a–22c. The packet typically includes a packet header 22a. The packet header may include a number of fields. One field typically identifies (in some manner) the path over which the packet should traverse. For example, the header could contain a unique path identifier that specifies the entire path through a network. In the alternative, the header 22a may include a destination address, that identifies the intended destination for the packet. Many communication protocols include both a destination address and a source address for the packet, as a part of header 22a. The packet may also include a trailer 22c. Both the header and the trailer typically include network, routing, format, error correction and detection, and other types of information, but not the actual data communicated. Typically, the data to be communicated or "payload" is a continuous block located between the header and trailer (or simply after the header, where there is no trailer), as illustrated at 22b.

When a packet is received from network interface 20a, it is placed into an input memory 21a. The input memory 21a can be any digital memory for storing received packets, including banks of registers, random access memory and other devices. The input memory 21a may be a buffer memory, capable of storing multiple packets which arrive from network interface 20a but have not yet been translated.

When a packet arrives, the controller 24 determines what translation is required. This is done by determining what the current communication protocol format is for the packet and the communication protocol required to forward the packet. Where network interface 20a is connected to only one type of network and network interface 20b is connected to only one (different) type of network, this function is simple to implement; the translation is always from one specific protocol to another specific protocol. Where multiple protocols may be placed into input memory 21a, and multiple protocols may be required for output, the controller may perform a table lookup or other procedure to determine what protocols are required. For example, the destination address and source address for a packet can be used to determine the source and destination protocols for the packet. For many types of packets, the header 22a will include information identifying the network protocol, and the destination will determine what the output communication protocol should be. In the event that a table lookup is performed, this may be done using an associated random access memory 25. Techniques for identifying what particular translation is required are currently known. Where more than one protocol translation is required, the multi-protocol translator (MPT) 26 performs the appropriate translation based on the information provided by the controller 24. These functions of the controller are described in greater detail below.

The controller 24 can be implemented in one of many ways. The controller will most likely be implemented using ASICs or programmable logic devices, for speed. A general processor could also be used to perform this function, as the amount of processing required to initiate packets is relatively small and delay incurred from use of a general purpose processor is minimal.

When an incoming packet 22a–22c has been received and stored in the input memory 21a, and after the controller has determined what translation to perform, the controller can begin the translation process.

In the embodiment of FIG. 2, the translation process is performed by two separate elements—the multi-protocol translator (MPT) 26 and the direct memory access (DMA) controller 27. The MPT 26 translates the header and trailer information from the first protocol (e.g., packet 22a–22c) into the header and trailer information for the new packet (23a–23c). The translated packet is stored in output memory 21b, and when complete is forwarded to the network interface 20b for transmission across the second network.

The MPT 26 could also forward the data portion 22b of the incoming packet into the output memory 21b. (This may be particularly useful where a trailer or other field needs to be formulated based on the contents of the entire packet, such as a check-sum field or other error detection or correction fields. By passing the data through the MPT, the applicable field can be accumulated as the output memory is written.) Because no change is required to the payload for most translations, however, in many cases this may be done using only a direct memory access ("DMA") controller 27. Thus, the DMA controller 27 can be forwarding data (payload) into the output memory while the MPT 26 is setting up the appropriate header and trailer information for the translated packet.

Figure 3:
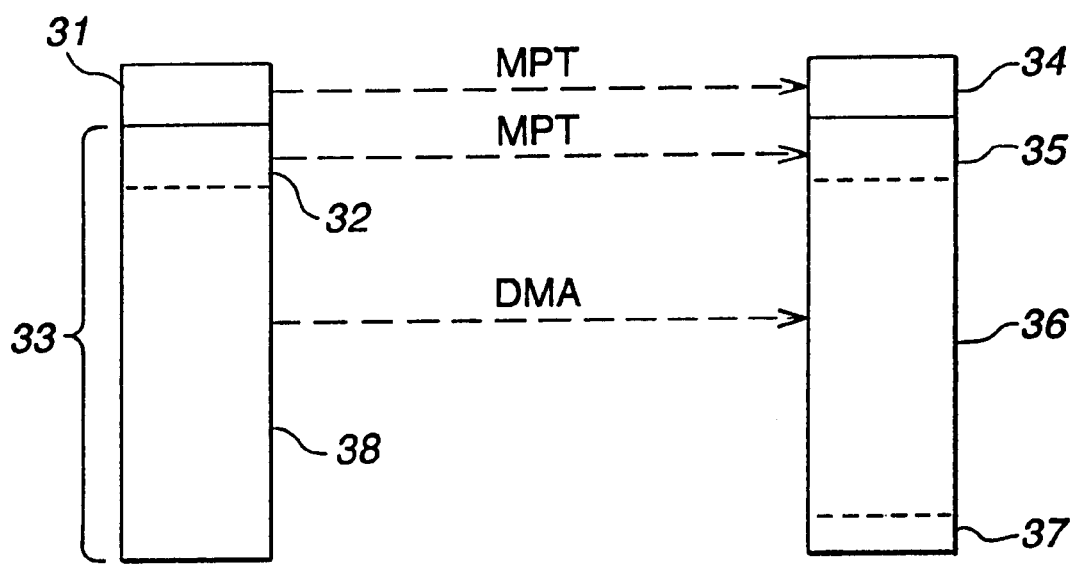
FIG. 3 illustrates translation from an original packet to a translated packet according to one embodiment of the present invention.

FIG. 3 illustrates the translation process from one packet (31–33) to a packet using a different communication protocol (34–37). The first packet includes a header 31, the remainder of the packet being data 33. As shown, the MPT translates the header of the first packet 31 into the new translated header 34. The MPT may also forward some of the payload 32 into the new translated packet, as shown at 35. The DMA controller 27 would then handle the transfer of the remainder of the payload 38. (The DMA controller 27 may include also a mechanism to alter byte alignment when multiple bytes are read from an input memory and/or multiple bytes written to an output memory, as explained with reference to the storage alignment units of FIGS. 9 and 10.)

The MPT might be configured to forward some of the data 32 to the new packet 35, to accommodate the possibility of variable length headers. For some communication protocols, the length of the header varies. One approach to resolving this is to have the system controller look up the header length and have the MPT process only the header, while the DMA transfers only data. Another solution, as illustrated in FIG. 3, is to take the maximum header size (here, equivalent to fields 31 and 32 of FIG. 3, which, in this example, includes some data because, in FIG. 3, the actual header is smaller than the assumed maximum header size) and always run that portion of an incoming packet through the MPT. In this case, while some data is unnecessarily transferred through the MPT, there is no need to perform an additional table lookup to determine where the header/data boundary is for the applicable incoming packet.

The embodiment of FIG. 2 provides for unidirectional translation. That is, packets are only received (and not transmitted) on network interface 20a, translated by the translator 28, and transmitted (and no packets received) from network interface 20b. To apply the translator 28 of FIG. 2 to the network of FIG. 1, two translator units 28 would be required. The first translator unit would handle packets traveling from the first network 10 to the second network 11. The second translator would handle packets traveling in the opposite direction (as in FIG. 4A).

The embodiment of FIG. 2 can be modified to handle bidirectional traffic. This can be achieved in at least two different ways. First, additional connections could be provided to permit translation both from memory 21a to memory 21b and vice versa. Thus, the DMA controller 27 would be capable of transferring data from the input memory 21a to the output memory 21b as before, and would also be able to directly transfer data from the memory 21b to the memory 21a when packets are being sent from network interface 20b to network interface 20a. Similarly, the MPT 26 would be capable of receiving information for translation from both memories 21a and 21b, and writing the translated header (or trailer) information to the other opposite memory.

Another possibility is to use input memory 21a only as an input buffer and output memory 21b only as an output buffer, but to permit both network interface 20a and 20b to provide incoming packets to the input memory 21a and allow output memory 21b to provide outgoing packets to both network interface 20a and 20b. In this case, the embodiment of FIG. 2 could remain the same, but adding switches, multiplexers or the equivalent to permit multiple inputs and outputs for the input and output memories 21a and 21b.

Figure 4A:
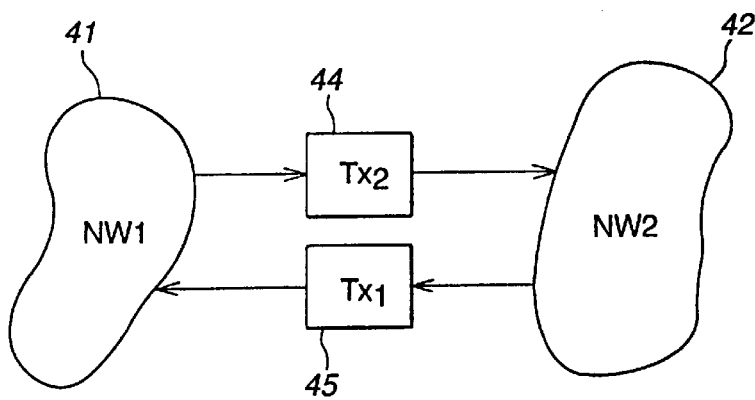
FIG. 4A illustrates one use of a translation unit according to the present invention.

FIG. 4A illustrates use of two unidirectional processors for translation between two networks. Thus, packets sent from a first network 41 to a second network 42 are translated by a translator 44. Packets sent from the second network 42 to the first network 41 are sent through a separate translator 45. This permits parallel processing, at the expense of added hardware.

Figure 4B:
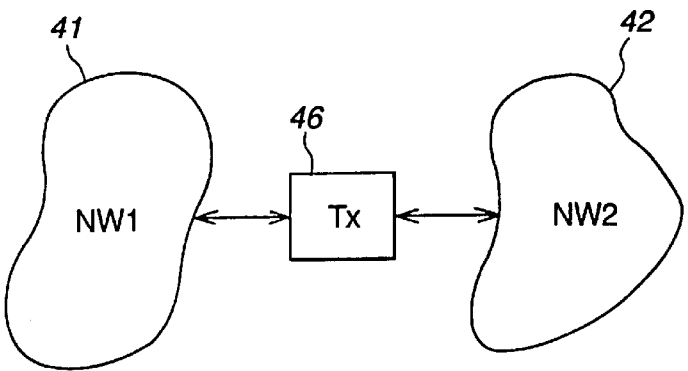
FIG. 4B illustrates a second embodiment using a translator according to the present invention.

FIG. 4B illustrates use of a single translator unit 46, as described above, to send packets both from the first network 41 to the second network 42 and vice versa. In this case, the translator must perform two transactions—NW1 to NW2 and NW2 to NW1.

Figure 4C:
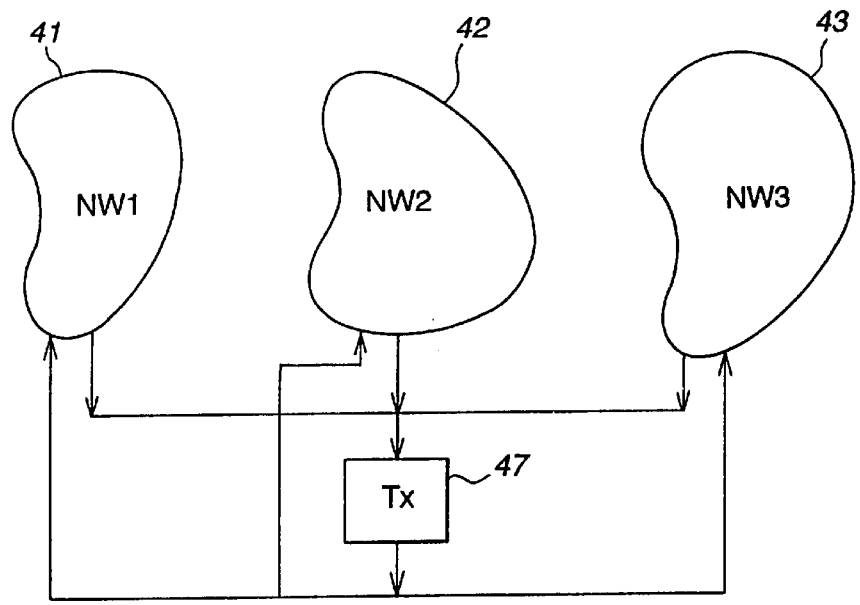
FIG. 4C illustrates a third embodiment using a translator unit according to the present invention to translate packets sent among three networks.

FIG. 4C illustrates use of a single translator 47 with additional networks. In this embodiment, the first network 41, second network 42 and third network 43 each have a different communication protocol. The multi-protocol translator 47 can receive packets from all three networks, translate them to the appropriate protocol for the destination network, and forward the packet accordingly. Of course, similar designs using any number of networks could be implemented.

Referring again to FIG. 2, the multi-protocol translator 26 should preferably be fast, flexible, programmable to handle multiple (and new) translations and upgradable without having to redesign the entire system.

Figure 5:
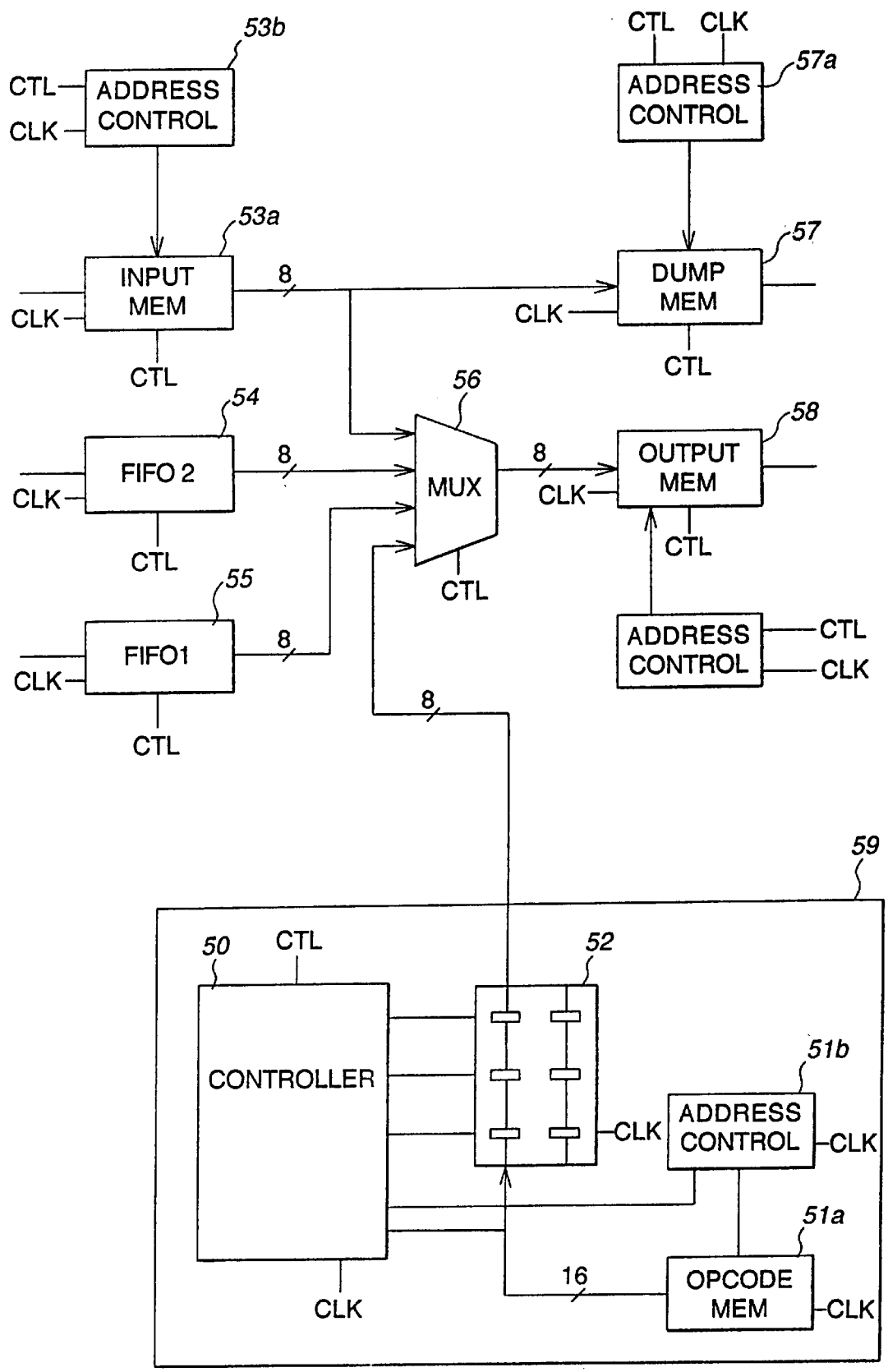
FIG. 5 illustrates the circuit for a multi-protocol translator according to one embodiment of the present invention.

FIG. 5 illustrates one embodiment of a multi-protocol translator according to the present invention. In general, the multi-protocol translator shown in the embodiment of FIG. 5 works as follows. The original frame (or frame to be translated) is held in memory 53a. Substitute information to be inserted into the translated frame is held (or produced) in other mechanisms. In FIG. 5, these information sources are the two FIFO memories 54 and 55. To produce a translated frame, data is selectively passed from the input memory 53a, information sources 54 and 55, and from instruction operands, into the output memory 58. The outgoing frame is then stored in the output memory 58. The appropriate data is passed through a multiplexer 56 into the output memory. A microcoded, pipelined control unit 59 controls the reading of the memories 53a, 54 and 55 and the passing of data to the output memory 58 through the multiplexer 56. Thus, in FIG. 5, the translator has an input memory 53a, in which the original frame (the frame to be translated) is stored. This input memory 53a may receive the frame directly from a network interface as described above, or may be an additional buffer internal to the multi-protocol translator.

In the embodiment of FIG. 5, an address control unit 53b controls what memory location is read from the input memory for use in the translation. The address control unit 53b may further control the input memory for writing the original frame into the memory, as could be readily designed by one of skill in the art based on the disclosure provided herein.

The MPT also includes two first-in-first-out ("FIFO") memories 54 and 55. These memories contain new header information that may be required in one of the translations that the MPT can perform. Thus, the two FIFOs 54, 55 provide alternative information that can be used to replace or supplement the header (or trailer) information in the original frame, during translation. Of course, other mechanisms and other forms of memory could be used in place of FIFOs 54 and 55. More complicated information sources might include mechanisms to generate new fields based on previous fields, such as a check-sum or other error detection or correction field. The number of information sources may also vary, depending on what translation(s) the MPT can perform.

A dump memory 57 may be included. The dump memory would serve to save information from the original frame (or the entire original frame) for system administration, diagnostic purposes, or for some other form of processing. Addressing of the dump memory 57 may be controlled by an address control unit 57a.

A multiplexer 56 selectively provides the appropriate data from the input memory 53a, FIFO 54 and 55 or from the controller, to the output memory 58. Of course, mechanisms other than multiplexers could be used to perform the same function.

The output memory 58 can be any suitable memory (including registers, random access memory, etc.) to hold the translated frame (or the portion of the frame being translated by the MPT) during processing. Of course, multiple input or output buffers may be used, particularly where the buffer may be providing data to more than one network interface. Similarly, the input and output memories may be formed within the same single larger memory unit or made up of multiple smaller memory units.

To reduce the delay from memory read latency, the translator control unit is configured to issue read instructions in a pipelined fashion. In order to maintain flexibility and permit new translations to be performed on existing structures, the translator control unit 59 is also microcoded. Accordingly, the translator control unit includes an opcode memory 51a that stores the various instructions required for all of the translations that the MPT is capable of performing. The stepping through of the instructions performed in the opcode memory is controlled by the address control unit 51b. Instructions are fed from the opcode memory 51a to a pipeline unit 52. In the embodiment of FIG. 5, the pipeline is implemented as a three stage, two-register pipeline. One register pipeline of the two-register pipeline is used for opcodes. The other pipeline is used for operands (which are also stored in the opcode memory 51a).

At the beginning of the translation process, the controller 24 of FIG. 2 selects the appropriate microcoded instructions stored in the opcode memory 51a for use in the applicable translation (i.e., depending on the original and the new protocol for the translation). The controller 24 sets the address control 51b to the appropriate start place for the translation process.

The controller 50 takes the opcode information from the pipeline 52 (received from the opcode memory 51a) and appropriately sends control signals to the information source components for the translated header, e.g., the input memory 53a and the FIFOs 54 and 55. In addition, the controller controls the multiplexer, which selects the data being fed to the output memory 58 for any given write cycle of the output memory 58. The controller 50 also controls what original frame information is recorded in the dump memory 57 and controls writing output memory 58 by controlling the multiplexer 56 and the output memory 58 (including its associated address control).

The controller 50 can be implemented using discrete components or as part of an ASIC or using programmable logic arrays. The controller 50 may also be implemented using a general purpose central processing unit, although this level of complexity may not be necessary for many implementations.

The lag time necessary to retrieve information from the various sources that make up the translated header can vary. For example, the time required to read from the input memory 53a may be longer than the time required to read from one of the FIFOs 54 and 55. Information coming directly from the translator control unit 59 could be written immediately. Thus, the example circuit of FIG. 5 has three different read latencies: input memory (two clocks), FIFO (one clock), and data written from the controller (immediate).

To reduce delays from memory latency, the pipeline 52 has three stages. For an opcode indicating data is to be transferred from the input memory to the output memory is encountered, the controller issues the appropriate read command to the input memory 53a when the opcode is in the first register of the pipeline in the pipeline unit 52. In subsequent stages of the pipeline, that opcode can be ignored, until the last stage, where the controller 50 configures multiplexer 56 to transfer the then-ready data from the input memory 53a to the output memory 58.

When data is to be written from one of the FIFO memories 54 and 55, the applicable opcode instruction is ignored in the first stage of the pipeline, and the appropriate command is issued in the second stage of the pipeline in the pipeline unit 52 (due to the shorter read latency). When the command reaches the last stage of the pipeline, the controller 50 causes the multiplexer 56 to transfer the then-ready data from the FIFO to the output memory.

Finally, for information to be written directly to the output memory from the operand, the applicable opcode is ignored in the first two stages of the pipe, and the applicable write is made in the last stage of the pipe in the pipeline unit 52.

Figure 6:
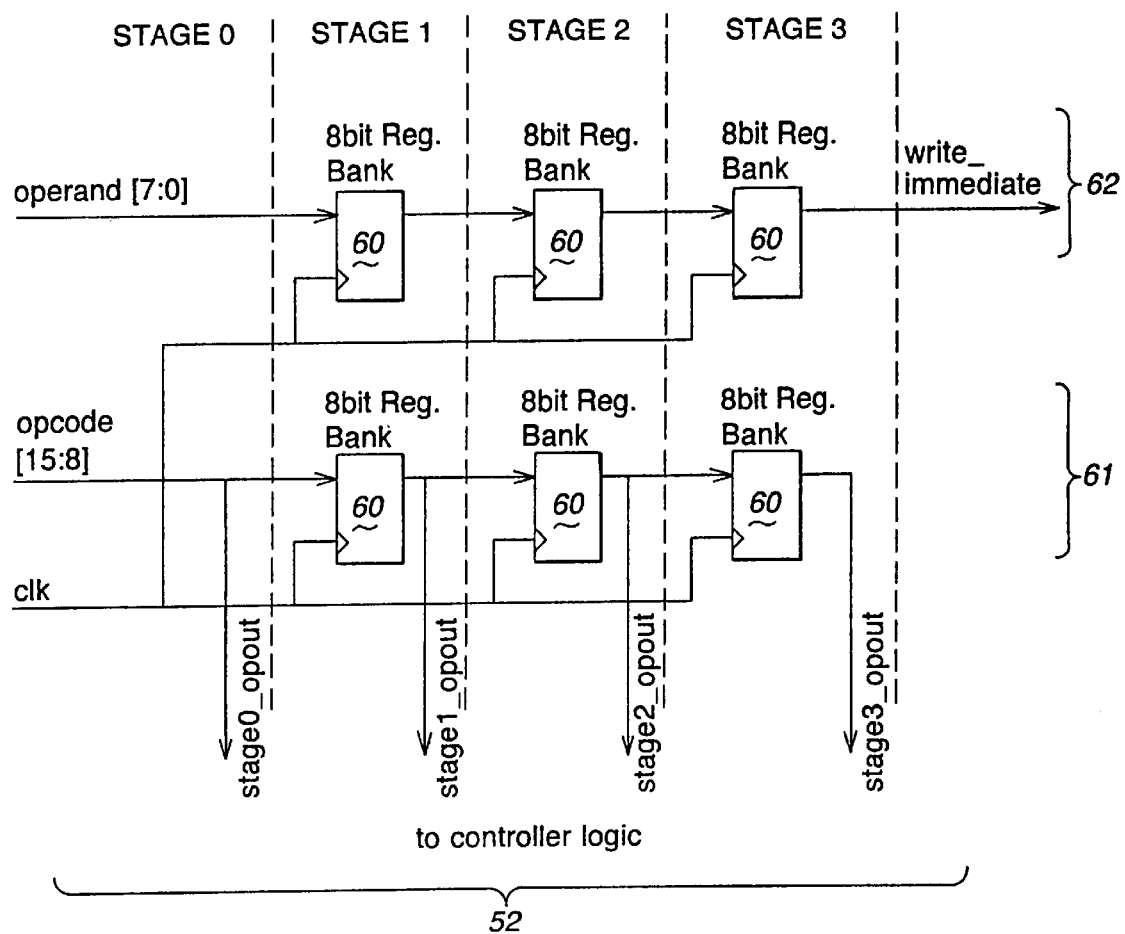
FIG. 6 illustrates one embodiment of a pipeline unit for use in the multi-protocol translator of FIG. 5.

FIG. 6 illustrates a simple circuit design for the pipeline unit 52 of FIG. 5. The pipeline is implemented using 8 bit register banks (or latches) 60. The operand is fed through a first set of registers 62 while the opcode is fed through a second set of registers 61. All of the registers 60 are clocked off of a common system clock CLK. Each of the stages of opcodes provides information to the controller 50. The operand from the operand pipe 62 is directed to the output memory 58, through the multiplexer 56.

The opcode memory may also effectively be used as an additional stage of the pipeline. For example, instructions to change the address of the input memory can be taken by the controller 50 and used to immediately begin the address change.

A set of instructions that may be used to program a translation using the multi-protocol translator of FIG. 5 is illustrated in the following Table 1:

TABLE 1

Single Pipe MPT Instructions

| Name | Operand | Description |
| --- | --- | --- |
| READ_ORIG | no | Move Byte from input memory to output memory |
| READ_ORIG_DUMP | no | Move Byte from input memory to dump memory |
| READ_FIFO1 | no | Move Byte from FIFO1 to output memory |
| READ_FIFO2 | no | Move Byte from FIFO2 to output memory |
| WRITE_IM | yes | Move operand to output memory |
| JUMP_ORIG_DUMP | yes | Jump to new ORIG address (per operand value) and write to output memory |
| JUMP_OPCODE | yes | Go to a "subroutine" address in a opcode memory space |
| RETURN_OPCODE | yes | Return to opcode address + 1 which was stored when jump occurred |
| RETURN_ORIG | no | Return to input memory address + 1 which was stored when jump occurred |
| END | no | Tells controller that translation is finished |

The operation of the multi-protocol translator illustrated in FIG. 5 can be understood in reference to the following example. The example shows conversion from L2 VLAN tagged Ethernet dixie (e.g., FIG. 7A) to ATM Forum LANE 2.0 communication protocol (as shown in FIG. 7B).

Figure 7A:
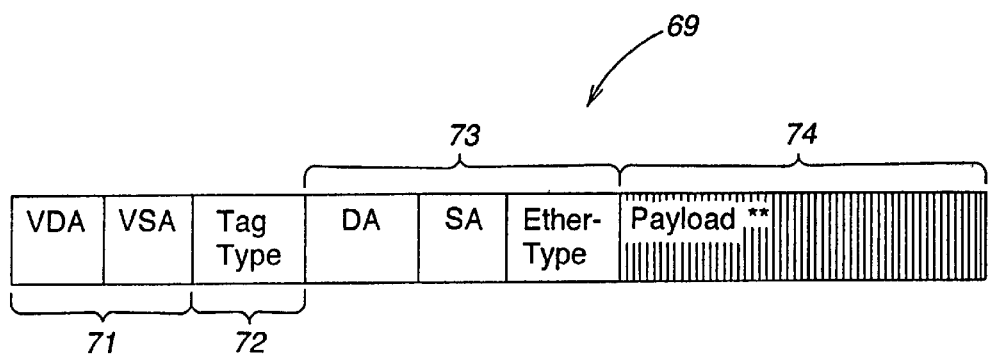
FIG. 7A illustrates a packet formatted according to the L2 VLAN tagged Ethernet dixie communication protocol.

FIG. 7A illustrates the format of a packet according to the L2 VLAN tagged Ethernet dixie communication protocol. A virtual destination address (VDA) and virtual source address (VSA) are the first two fields 71 of the packet 69. A tag type 72 is included. A destination address (DA), source address (SA) and ether type fields 73 are included. Finally, at the end of the packet, is the data or payload 74. The L2 VLAN tagged Ethernet dixie protocol is known to those of skill in the art.

Figure 7B:
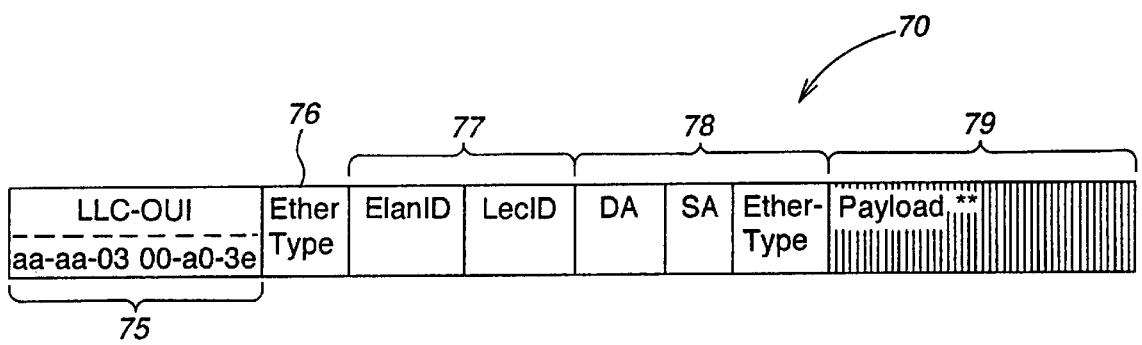
FIG. 7B illustrates the packet of FIG. 7A, translated to the ATM Forum LANE 2.0 communication protocol.

In this example, a packet of the L2 VLAN tagged Ethernet dixie protocol format illustrated in FIG. 7A is converted to the format of ATM Forum LANE 2.0, as illustrated in FIG. 7B. In the ATM Forum LANE 2.0 packet 70 of FIG. 7B, the first field 75 is a fixed communication protocol identifier and is the same for every packet formatted according to this protocol. An ether-type 76 is included (different from the ether type shown in FIG. 7A). An ElanID and LecID fields 77 are included. These fields are determined according to the protocol, and, in this example, loaded into the FIFO for the translation. Destination and source addresses and ether type fields 78 are included, which are identical in content to the corresponding fields 73 of FIG. 7A. Finally, a packet according to the ATM Forum LANE 2.0 protocol includes a payload 79 at the end. The payload 79 in the translated packet is identical to the payload 74 of the original packet.

Figure 8:
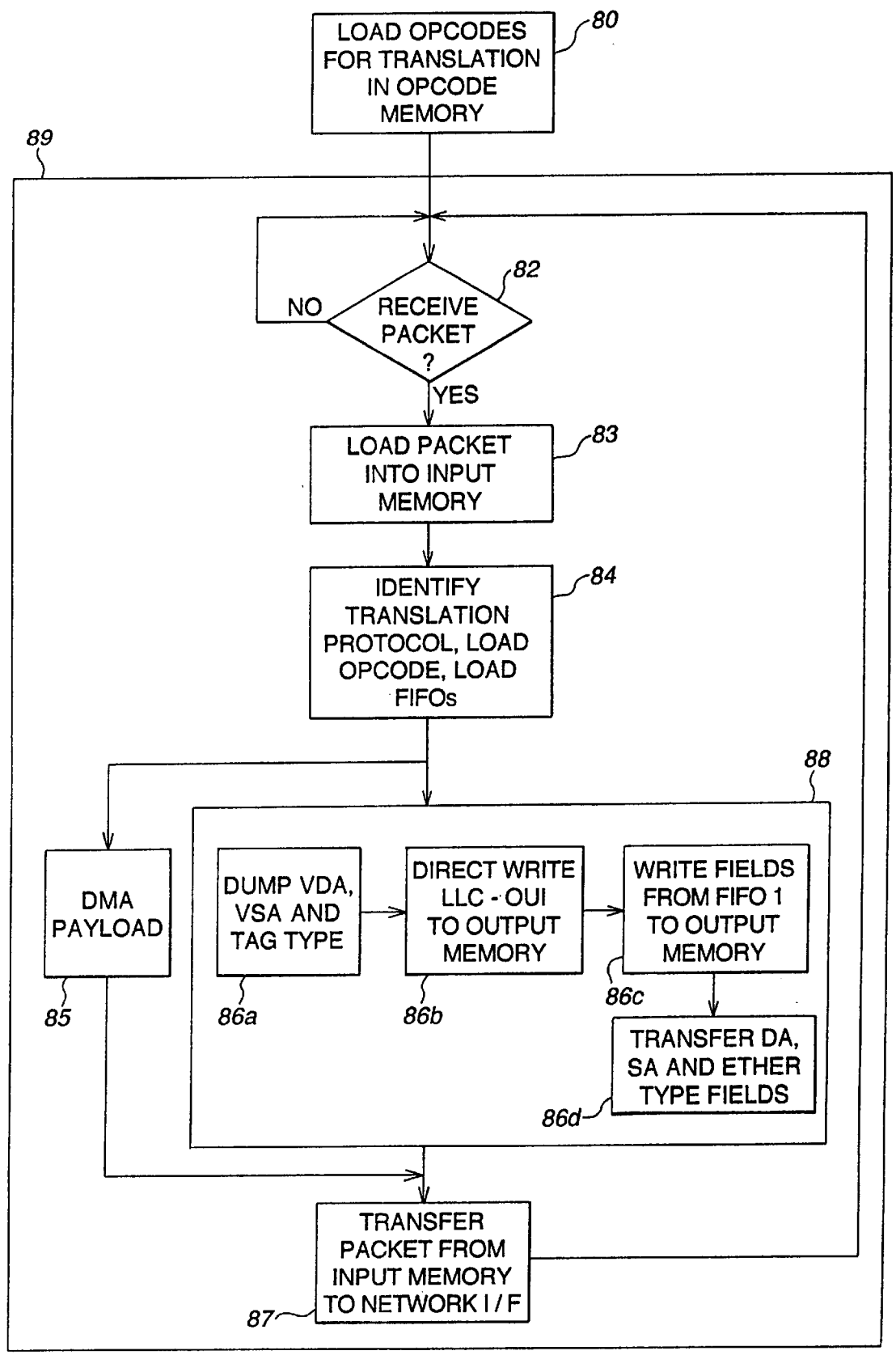
FIG. 8 illustrates a method of translating a communication packet according to one embodiment of the present invention.

FIG. 8 illustrates a method of using a multi-protocol translator of FIG. 5 to translate the packet of FIG. 7A (L2 VLAN tagged Ethernet dixie) into the packet of FIG. 7B (ATM Forum LANE 2.0). At a step 80, the applicable operation codes (in this case, including operands) for the translation are loaded into the opcode memory 51A of FIG. 5. This is typically done at initialization, not during translation.

Block 89 illustrates the normal processing of a packet using one embodiment of a multi-protocol translator according to the present invention. At a step 82, the translator waits to receive a packet. Once a packet is received, processing begins at a step 83.

At step 83, the packet is loaded into the input memory 53a of the translator.

At a step 84, the controller 24 (of FIG. 2) identifies what translation is required. This is done by examining the protocol of the incoming packet and determining (based on the destination of the packet) the protocol to which the packet should be translated. At a step 84, FIFO1 55 of FIG. 5 is also loaded with the ATM Forum LANE 2.0 ether type, ElanID and LecID fields (determined by the controller for the applicable packet using methods known in the art for this communication protocol).

In this embodiment, after the applicable translation has been identified, the payload of the packet (74 of FIG. 7A) is directly transferred into the output memory 58 of FIG. 5 (the DMA path is not shown in FIG. 5) step 85.

In this embodiment, while the payload is being transferred from the input to the output memory, the multi-protocol translator unit translates the header information of the original packet into the appropriate header for the translated packet.

The header translation 88 is performed as illustrated at steps 86a–86d.

At step 86a, the initial fields of the original packet are dumped (fields 71, 72 of FIG. 7A). This may be accomplished either by stepping through these fields of the packet header and writing the information only to the dump memory 57 of FIG. 5. In the alternative, where the information need not be saved, the controller can simply cause the address control 53b of the input memory 53a to jump over these fields.

At step 86b, the LLC-OUI header is written to the output memory. In this particular embodiment, the LLC-OUI field is written directly from the opcode memory. That is, a series of microcode instructions write the operand directly from the pipeline unit 52 to the output memory 58 of FIG. 5 (through multiplexer 56). Thus, for the LLC-OUI field (75 of FIG. 7B), the entire field is contained as operands in the opcode memory and transferred by directly writing the operands to the output memory. Thus, when the opcode is provided to the pipeline unit 52, nothing happens immediately. (However, since it is pipelined, previous and subsequent opcodes may be active, depending on the opcode and the stage the opcode is in.) Instead, the operand passes through the three stages of the pipeline, with the operand being written when the instruction is in the last stage of the pipeline 52.

At a step 86c, the Ether type, ElanID and LecID fields (76, 77 of FIG. 7B) are written from FIFO1 55 of FIG. 5 to the output memory 58. In this particular embodiment, the lag time of the FIFO1 55 read before the output memory can be written is two clock cycles. Accordingly, when an instruction from the opcode memory 51a is passed to the pipeline 52, calling for writing data from FIFO1 55 to the output memory 58, nothing happens at the first stage. At the second stage, however, the read command is issued to FIFO1 55. When the opcode reaches the last stage of the pipeline unit 52, the data is ready to be read from FIFO1 to the output memory. Accordingly, when that instruction is in the last stage of the pipeline, the instruction causes the controller 50 to configure the multiplexer 56 to pass data from FIFO1 55 to the output memory 58 and sets up output memory 58 for the appropriate write. In the meantime, a new read is issued from the second stage of the pipeline unit 52, to setup the next data to be written from FIFO1 55 to output memory 58.

Finally, at a step 86d, the DA, SA and Ether type fields of the original packet (field 73 of FIG. 7A) are transferred directly to the output memory 58 (corresponding to field 78 of FIG. 7B). In this example, the input memory 53a is assumed to have a latency period (in clock cycles) longer than the FIFO (two clock cycles rather than one). Accordingly, when the opcode is placed in the pipeline unit 52, a read command is issued at the first stage of the pipeline 52. When the opcode corresponding to transfer of data from input memory 53a to output memory 58 reaches the last stage of the pipeline 52, the data is ready to be passed from the input memory 53a to the output memory 58 (the clock cycles corresponding to the latency of input memory having passed, while the opcode is passing through the pipeline 52). Accordingly, when the command reaches the last stage of pipeline 52, it causes the controller 50 to configure the multiplexer 56 to pass data from the input memory 53a to the output memory 58 (as well as enabling writing of the output memory 58).

When steps 85 and 88 are complete, the complete translated packet is in the output memory 58 of FIG. 5. Accordingly, at a step 87, the packet can be transferred from the output memory to the network interface for propagation to its applicable destination address. When this is done, processing may continue at step 82.

As might be appreciated from the disclosure provided above, the multiplexer 56 of FIG. 5 should be configured so that the data path into the output memory 58 is open before the setup time of the output memory logic, but after the hold time of the multiplexer logic. If the sum of the setup and hold time of the multiplexer plus the hold time of the input path plus the setup of the output logic exceeds one clock cycle, the multiplexer configuration may be performed at an earlier stage (e.g., the second stage) of the pipeline 52. This would make the multiplexer control logic based on the previous stage rather than decoded from the current last stage.

In the embodiment of FIG. 5, a one byte channel is used to move information from the applicable source (pipeline operand, FIFO memory or input memory) to the output memory. The throughput of the translator can be increased by providing for a wider data channel.

Figure 9:
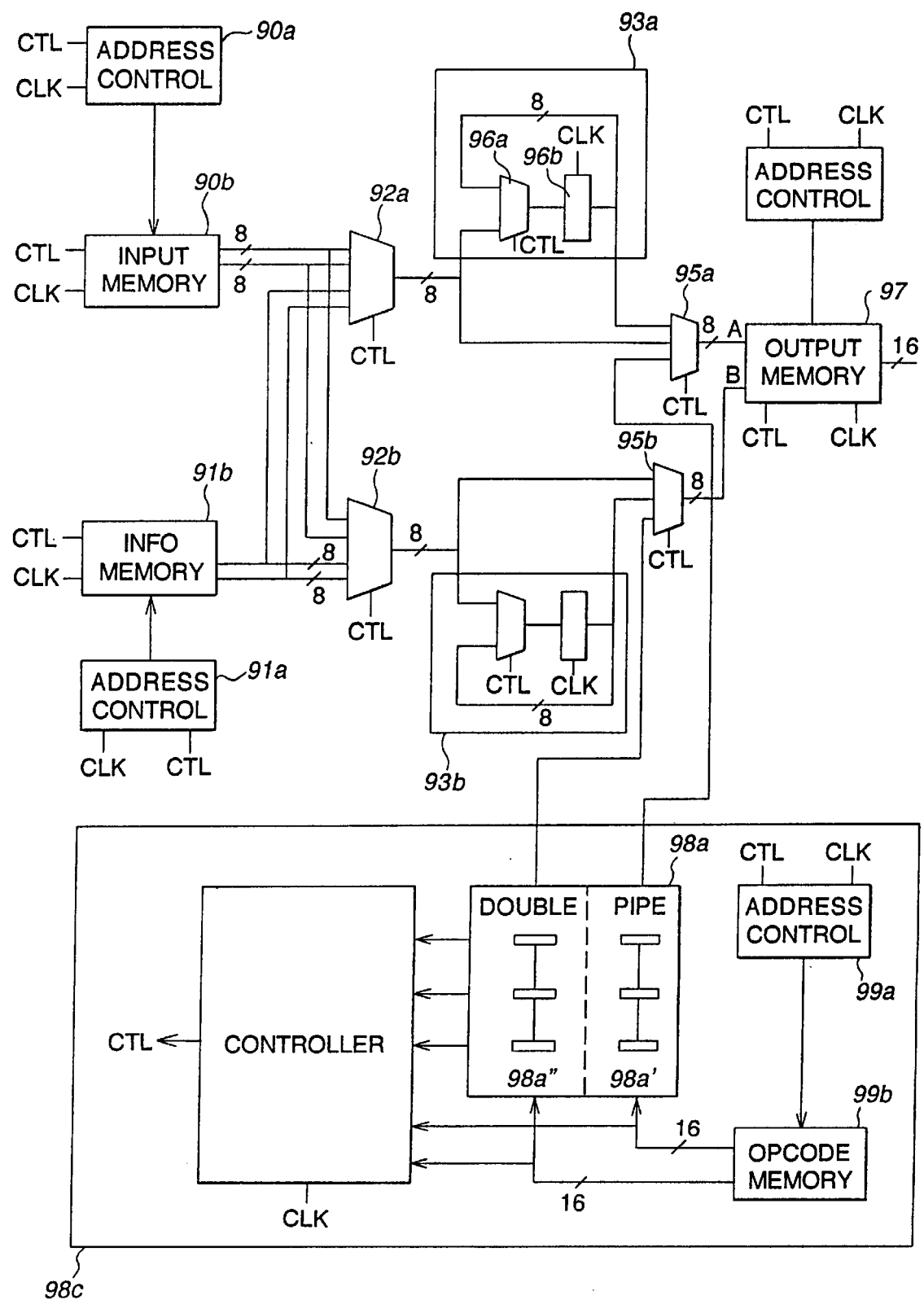
FIG. 9 illustrates another embodiment of a multi-protocol translator according to the present invention, including a double pipeline unit.

FIG. 9 illustrates a multi-protocol translator unit that includes a sixteen bit (two byte) data channel, according to the present invention. In the embodiment of FIG. 9, the incoming, original packets are stored in input memory 90b, which is controlled by an address control 90a, as in FIG. 5. The difference, however, is that the input memory can read two bytes of information from the data packet.

The translator includes an information memory 91b, controlled by an address control 91a. Memory 91b stores information to be written into the translated header, and functions similar to the FIFO memory illustrated in FIG. 5. A difference, however, is that two bytes of information can be read from the information memory 91b.

Like the input memory 90b and the information memory 91b, the output memory 97 can receive two bytes of information. Thus, two single byte channels of information, A and B, can be simultaneously written to the output memory. A byte of data from the input memory can be provided to the A channel or the B channel of the output memory 97. Multiplexer 92a selects the applicable byte from the input memory 90b or the information memory 91b for provision along the A channel to be written in the output memory 97. Similarly, multiplexer 92b selects a byte from the information memory or input memory to be provided to the B channel of the output memory 97, through multiplexer 95b. Multiplexers 95a and 95b select the data lines for connection to the applicable channel of the output memory 97, permitting data to be written from the translator control unit 98c, the input memory or information memory data selected by the applicable multiplexer 92a or 92b, or the data stored in storage alignment units 93a and 93b.

The storage alignment unit 93a serves to hold data to be written to the output memory 97 in later clock cycles. Thus, if information needs to be delayed before being written to the output memory, that information can be held for one or more clock cycles in the storage alignment unit 93a. This permits data to be held and realigned when written to the output memory 97. For example, if a byte becomes available in the data passed from multiplexer 92a before the corresponding data to be written in channel B of the output memory 97 is available, the A channel information can be held and delayed in storage alignment unit 93a. When the corresponding byte for channel B of the output memory 97 is available, the delayed information held in storage alignment unit 93a can be written to the A channel of the output memory 97, through multiplexer 95a.

The storage alignment unit 93a includes a multiplexer 96a and a register 96b. In this particular embodiment, the register is written on every clock cycle. Accordingly, if the data needs to be delayed for more than one clock cycle, the data held in 96b needs to be refreshed (or maintained) through multiplexer 96a. An example of a translation using the delay units 93a and 93b is provided below in connection with an embodiment that has four data channels that may be written to the output memory at one time.

The control unit 98c has a similar configuration to the control unit 59 of FIG. 5. An opcode memory 99b stores the opcodes and operands for controlling the entire translator unit. An address control 99a controls the opcodes being read from the opcode memory 99b. The opcode memory 99b, however, includes two opcode/operand channels, each sixteen bits wide. The first opcode/operand pair is fed to a first pipeline 98*a*', like the pipeline unit 52 of FIG. 5. The second opcode/operand pair is fed to a second pipeline 98*a*', also like the pipeline unit 52 of FIG. 5. The two sections 98*a*', 98*a*" of the double pipeline unit 98*a* permit separate control for components used in writing the A channel and B channel of output memory 97.

In this embodiment, the double pipeline unit 98*a* includes two three-stage pipelines. In this particular embodiment, three stages were selected to correspond to different latencies from the various components that provide data to the output memory 97. Thus, the input memory 90*b* might have one read latency, the information memory 91*b* a different (e.g., shorter) read latency, and the information being written directly from an operand held in the last stage of either side of the double pipeline unit 98*a* having no latency.

A set of instructions that may be used for the translator unit of FIG. 9 are listed in the following table:

done in altering the embodiment of FIG. 5 to FIG. 9), the throughput of the translator unit can be increased. The number of channels can of course be increased beyond two.

Figure 10:
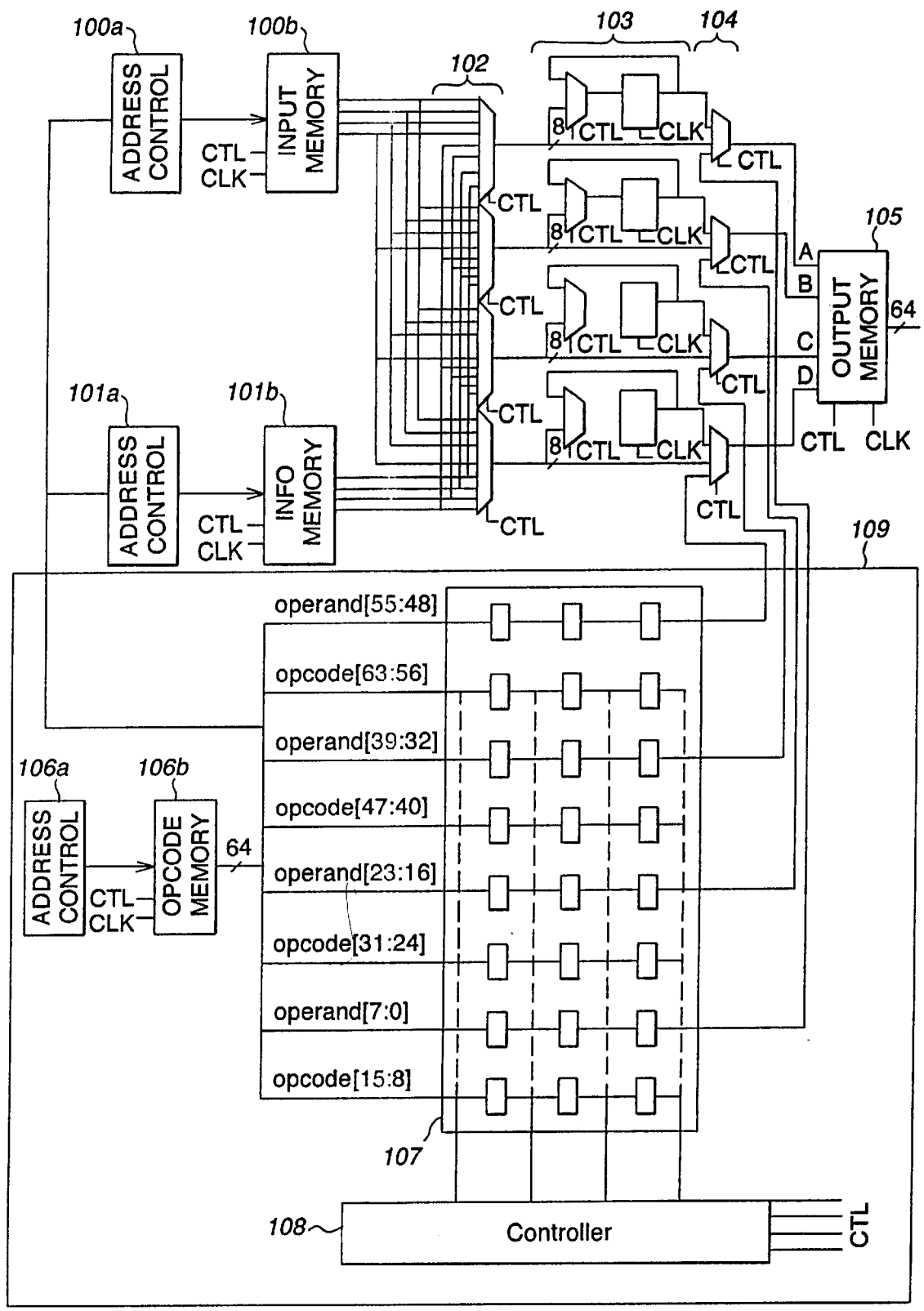
FIG. 10 illustrates another embodiment of a multi-protocol translator according to the present invention, including a quad pipeline.

FIG. 10 illustrates an embodiment of a translator unit where four channels A, B, C and D can be written simultaneously to an output memory 105.

Like the earlier embodiments, this embodiment has an input memory 100*b* for storing the original frame to be translated. The input memory 100*b* is controlled by an address control unit 100*a*. Similarly, information to be inserted into the translated header of the translated packet is stored in an information memory 101*b*, which is controlled by an address control unit 101*a*. Unlike the earlier embodiments, however, four bytes of data can be read from each of the input memory 100*b* and information memory 101*b* in one clock cycle.

A set of four multiplexers 102 permit any of the output bytes of the input memory 100*b* and information memory

TABLE 2

| Name | Operand | Description |
| --- | --- | --- |
| R_ORIG_U_A | no | read upper Byte lane of input memory and advance address controller |
| R_ORIG_L_A | no | read lower Byte lane of input memory and advance address controller |
| R_ORIG_U_NA | no | read upper Byte lane of input memory and do not advance address controller |
| R_ORIG_U_NA | no | read lower Byte lane of input memory and do not advance address controller |
| PRELOAD_ORIG_U | yes | preload input memory address controller with address in operand and read from upper Byte lane |
| PRELOAD_ORIG_L | yes | preload input memory address controller with address in operand and read from lower Byte lane |
| R_INFO_U_A | no | read upper Byte lane of INFO memory and advance address controller |
| R_INFO_L_A | no | read lower Byte lane of INFO memory and advance address controller |
| R_INFO_U_NA | no | read upper Byte lane of INFO memory and do not advance address controller |
| R_INFO_U_NA | no | read lower Byte lane of INFO memory and do not advance address controller |
| PRELOAD_INFO_U | yes | preload INFO memory address controller with address in operand and read from upper Byte lane |
| PRELOAD_INFO_L | yes | preload INFO memory address controller with address in operand and read from lower Byte lane |
| R_BYTE_STORE | no | read byte stored in Delay Unit |
| WRITE_IM | yes | write operand into output memory |
| JUMP_OPCODE | yes | change the current address of the opcode address controller to the operand. Store off current address to opcode jump register |
| RETURN_OPCODE | no | change the current address of the opcode to the opcode jump register + 1; |
| STALL | no | do not write output memory |
| END | no | end of algorithm |

Each of the opcode/operand pairs listed in Table 2 can be fed to either side of the double pipeline unit 98*a*. That is, an entire opcode/operand output from the opcode memory 99*b* would include two instructions of the form listed in Table 2—one for each side. In selecting binary opcodes for these instructions, additional bits are dedicated to signal an individual function. One bit signals writing of the output memory 58. The other bit controlling reads and writes from an alignment storage unit 93*a* or 93*b*. Thus, each of the above instructions has four forms (encoded with the two extra bits)—any combination of commands for writing the output memory (0 or 1) and writing the applicable storage alignment unit (0 or 1).

By increasing the number of bytes that can be written to the output memory per clock cycle from one to two (as was

101*b* to be fed along a data channel that feeds any of the four input channels A, B, C and D of the output memory 105.

A series of four alignment storage units 103 permit a byte being fed along one of the data channels to the output memory to be stored, for alignment with subsequently read data on the other data channels. These alignment storage units are of the same configuration as described above with respect to the alignment storage units 93*a* and 93*b* of FIG. 9.

A set of four multiplexers 104 provide the fmal selection as to what data is actually written to the applicable data channel A, B, C, D of the output memory 105 for a particular clock cycle.

A control unit 109 controls the timing and application of data being written to the output memory 105. Like the earlier embodiments, this embodiment has an opcode memory 106b, controlled by an address control unit 106a. Unlike the earlier embodiments, however, this opcode memory provides a set of four opcodes, each with an applicable operand. Thus, sixty-four bits are provided as an output of the opcode memory 106b.

These four opcode/operand pairs are provided to a quad pipe. The quad pipe includes four pipelines of the type illustrated and described above with reference to pipeline unit 52 of FIG. 5. Each opcode/operand pair can perform one or more functions with respect to the components in one of the channels providing data to the output memory 105. Thus, because four different pipelines are functioning simultaneously, components in all four of the data channels can be controlled simultaneously and separately. Because there are three different memory latency cycles (one for the input memory, one for the information memory and the immediate write of an operand to the output memory through one of the multiplexers 104), this pipeline also has three stages.

A controller 108 takes the information from each of the stages of the pipeline, and each of the four pipeline units, and uses that information to provide the appropriate control signals for the remainder of the translator unit.

Table 3 sets forth a set of instructions that may be used to control the translator unit of FIG. 10.

TABLE 3

| | | Opcodes |
|---|---|---|
| Name | Operand | Description |
| R_ORIG_B3_A | no | read Byte lane 3 of input memory and advance address controller |
| R_ORIG_B2_A | no | read Byte lane 2 of input memory and advance address controller |
| R_ORIG_B1_A | no | read Byte lane 1 of input memory and advance address controller |
| R_ORIG_B0_A | no | read Byte lane 0 of input memory and advance address controller |
| R_ORIG_B3_NA | no | read Byte lane 3 of input memory and do not advance address controller |
| R_ORIG_B2_NA | no | read Byte lane 2 of input memory and do not advance address controller |
| R_ORIG_B1_NA | no | read Byte lane 1 of input memory and do not advance address controller |
| R_ORIG_B0_NA | no | read Byte lane 0 of input memory and do not advance address controller |
| PRELOAD_ORIG_B3 | yes | preload input memory address controller with address in operand and read from Byte lane 3 |
| PRELOAD_ORIG_B2 | yes | preload input memory address controller with address in operand and read from Byte lane 2 |
| PRELOAD_ORIG_B1 | yes | preload input memory address controller with address in operand and read from Byte lane 1 |
| PRELOAD_ORIG_B0 | yes | preload input memory address controller with address in operand and read from Byte lane 0 |
| R_INFO_B3_A | no | read Byte lane 3 of info memory and advance address controller |
| R_INFO_B2_A | no | read Byte lane 2 of info memory and advance address controller |
| R_INFO_B1_A | no | read Byte lane 1 of info memory and advance address controller |
| R_INFO_B0_A | no | read Byte lane 0 of info memory and advance address controller |
| R_INFO_B3_NA | no | read Byte lane 3 of info memory and do not advance address controller |
| R_INFO_B2_NA | no | read Byte lane 2 of info memory and do not advance address controller |
| R_INFO_B1_NA | no | read Byte lane 1 of info memory and do not advance address controller |
| R_INFO_B0_NA | no | read Byte lane 0 of info memory and do not advance address controller |
| PRELOAD_INFO_B3 | yes | preload info memory address controller with address in operand and read from Byte lane 3 |
| PRELOAD_INFO_B2 | yes | preload info memory address controller with address in operand and read from Byte lane 2 |
| PRELOAD_INFO_B1 | yes | preload info memory address controller with address in operand and read from Byte lane 1 |
| PRELOAD_INFO_B0 | yes | preload info memory address controller with address in operand and read from Byte lane 0 |
| R_BYTE_STORE | no | read byte stored in Alignment Storage |
| WRITE_IM | yes | write operand into output memory |
| JUMP_OPCODE | yes | change the current address of the opcode address controller to the operand. Store off current address to opcode jump register |

TABLE 3-continued

Opcodes

| Name | Operand | Description |
|---|---|---|
| RETURN_OPCODE | no | change the current address of the opcode to the opcode jump register + 1; |
| STALL | no | do not write output memory |
| END | no | end of algorithm |

As above, each of these opcodes applies to each of the data channels A, B, C, D of the output memory. Thus, the opcodes of Table 3 apply to just one of the channels, and each read from the opcode memory would produce four of such opcodes. In addition, like above, two extra bits for each opcode encode whether one or both of the output memory or applicable storage alignment unit is written.

Operation of the circuit of FIG. 10 can be understood through the following example. This example converts the L2 VLAN tagged Ethernet dixie packet illustrated and discussed with reference to FIG. 7A into the ATM Forum LANE 2.0 protocol, as illustrated and discussed with reference to FIG. 7B.

Figure 11A:
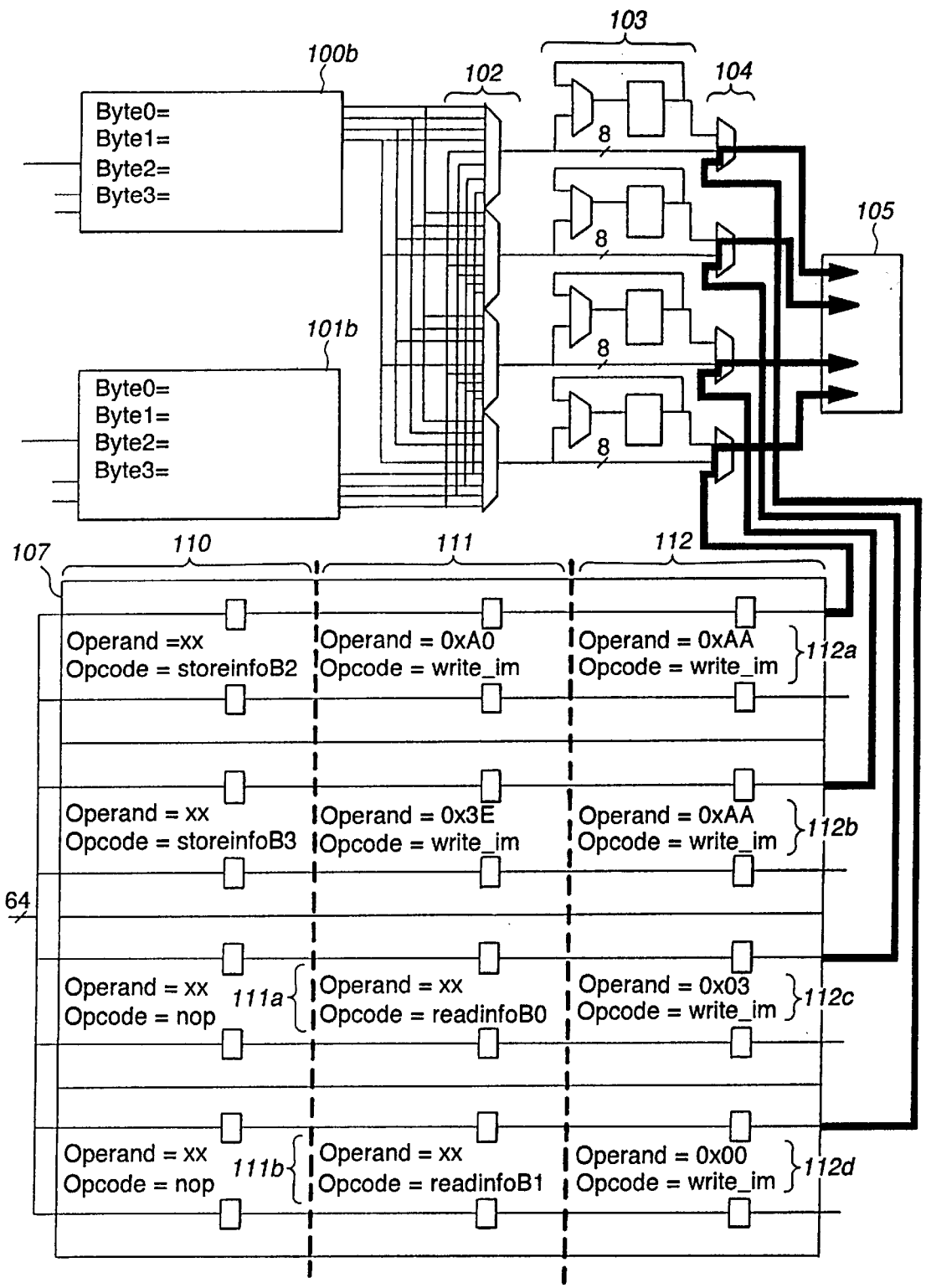
FIG. 11A illustrates one step of translating the packet of FIG. 7A into the packet of FIG. 7B, using the circuit of FIG. 10.

FIG. 11A illustrates the first write to output memory when using the translator unit of FIG. 10 to translate the packet of FIG. 7A into the packet of FIG. 7B. As shown in FIG. 11A, the pipeline 107 has already received three sets of instructions (over three clock cycles). In the last stage 112 of the pipeline at this step, an instruction 112a–112d in each of the four parallel pipelines causes data to be written immediately to the output memory 105. Thus, the four operands of the applicable instructions are written to the output memory during the next clock cycle. In FIGS. 11A–115A, the most significant byte is presumed to be at the bottom of the output memory 105. Accordingly, the opcode/operand pairs causes the sequence AA-AA-03-00 (4 bytes of data) to be written simultaneously to the output memory 105. The opcode "write_im" (write immediate) causes the control unit (not shown) to configure the multiplexers 104 to connect the applicable operands to the input of the output memory 105, as shown.

In the second to the last stage of the pipeline 111, two more write immediate codes are present as instructions. As described above, no action is taken when these instructions are at this stage of the pipeline, because the write immediate cannot immediately write data to the output memory 105 until reaching the last stage of the pipeline 107. Instructions 111a and 111b, however, cause information to be read from information memory 101b. Due to the latency of the memory 101b, the read information commands at 111a and 111b cause a read cycle to begin at the information memory 101b, when the read information operation code is in the second to last stage 111 of pipeline unit 107—so that the data is ready to be written to the output memory 105 when the data reaches the last stage 112 of the pipeline.

Figure 11B:
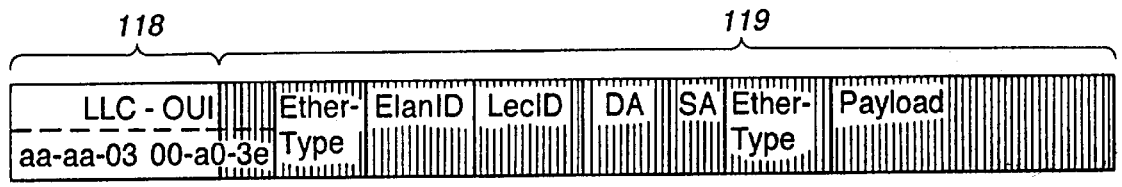
FIG. 11B illustrates the partial results of the translation, after the step shown in FIG. 11A.

FIG. 11B illustrates the state of the output memory after the operation performed in FIG. 11A. As illustrated, four bytes of the header 118 have been written. The remainder of the translated packet 119 has not yet been written to the output memory.

Figure 12B:
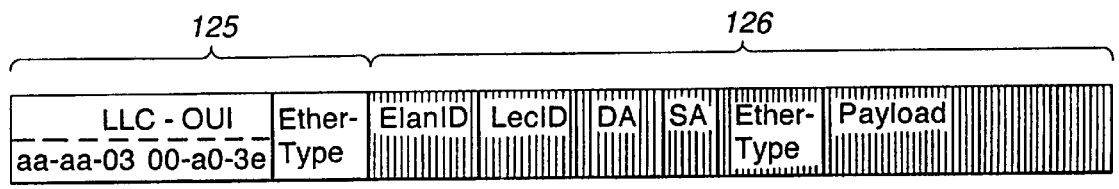
FIG. 12B illustrates the partial results of the translation, after the step illustrated in FIG. 12A is performed.
Figure 12A:
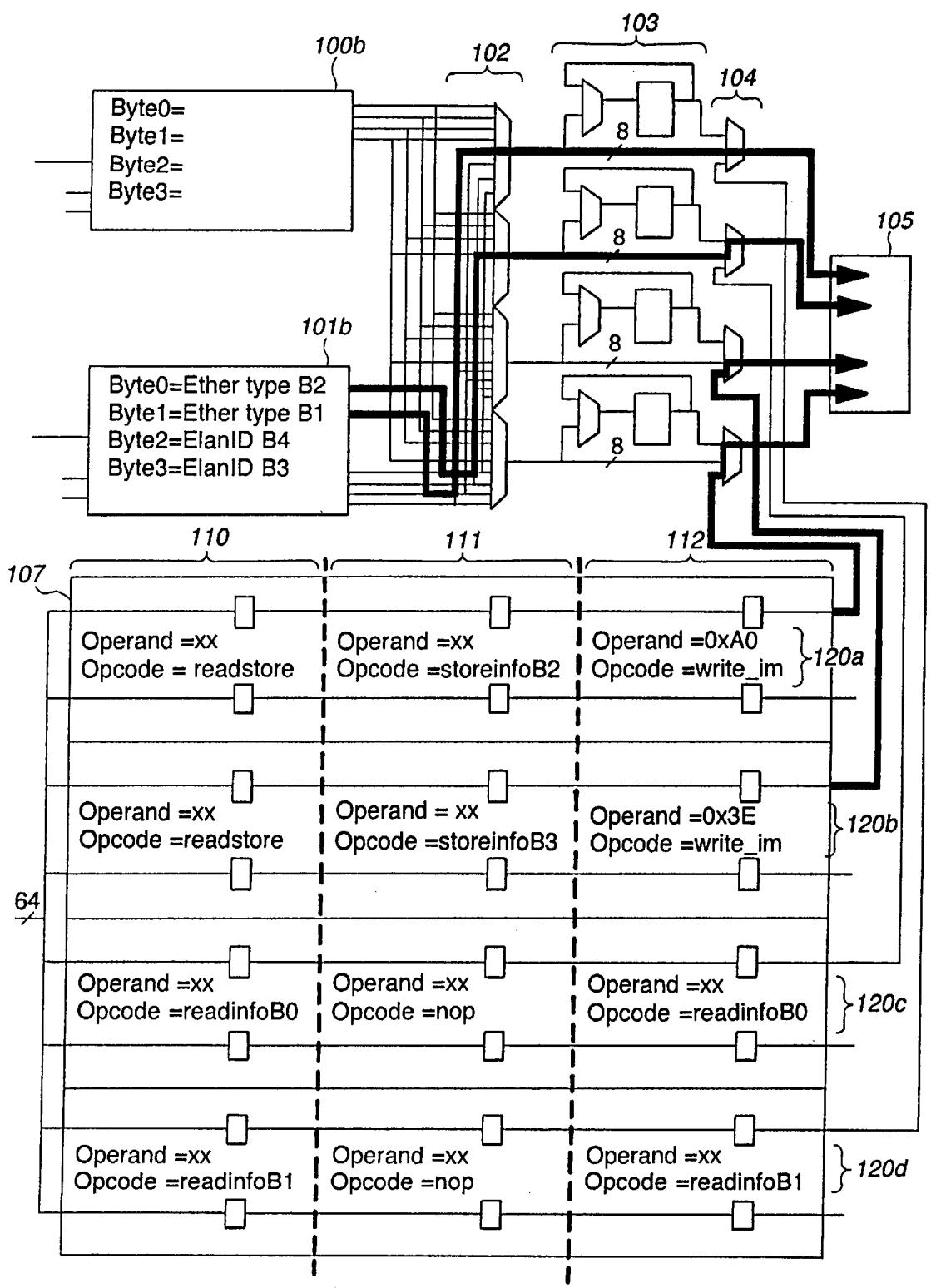
FIG. 12A illustrates a subsequent step in translating the packet of FIG. 7A into the packet of FIG. 7B, using the circuit of FIG. 10.

FIG. 12A illustrates the next step in translating the packet. At this point, the last stage 112 of the pipeline unit 107 has two write immediate commands 120a and 120b. These two commands write the last two bytes of the fixed header of the translated packet (shown in FIG. 7B). The instructions to read information from the information memory 120c and 120d have also reached the last stage of the pipeline. Because the read was initiated during the preceding clock cycle (shown in FIG. 11A), the information is now ready to be transferred from the information memory 101b to the output memory 105. Accordingly, the control unit (not shown) configures the appropriate multiplexers 104 to pass the information directly into the output memory 105. As shown within the box illustrating information memory 101b, the two bytes of the Ether-type are stored in bytes "0" and "1" of the four byte word stored in the information memory 101b. Thus, the illustrated connection transfers the Ether-type bytes to the output memory 105.

FIG. 12B illustrates the packet as stored in the output memory 105 after the step illustrated in FIG. 12A takes place. As shown, the leading header and Ether-type have now been written to the output memory 105, as shown at 125. The remainder of the translated packet 126 has not yet been written to the output memory 105.

Figure 13:
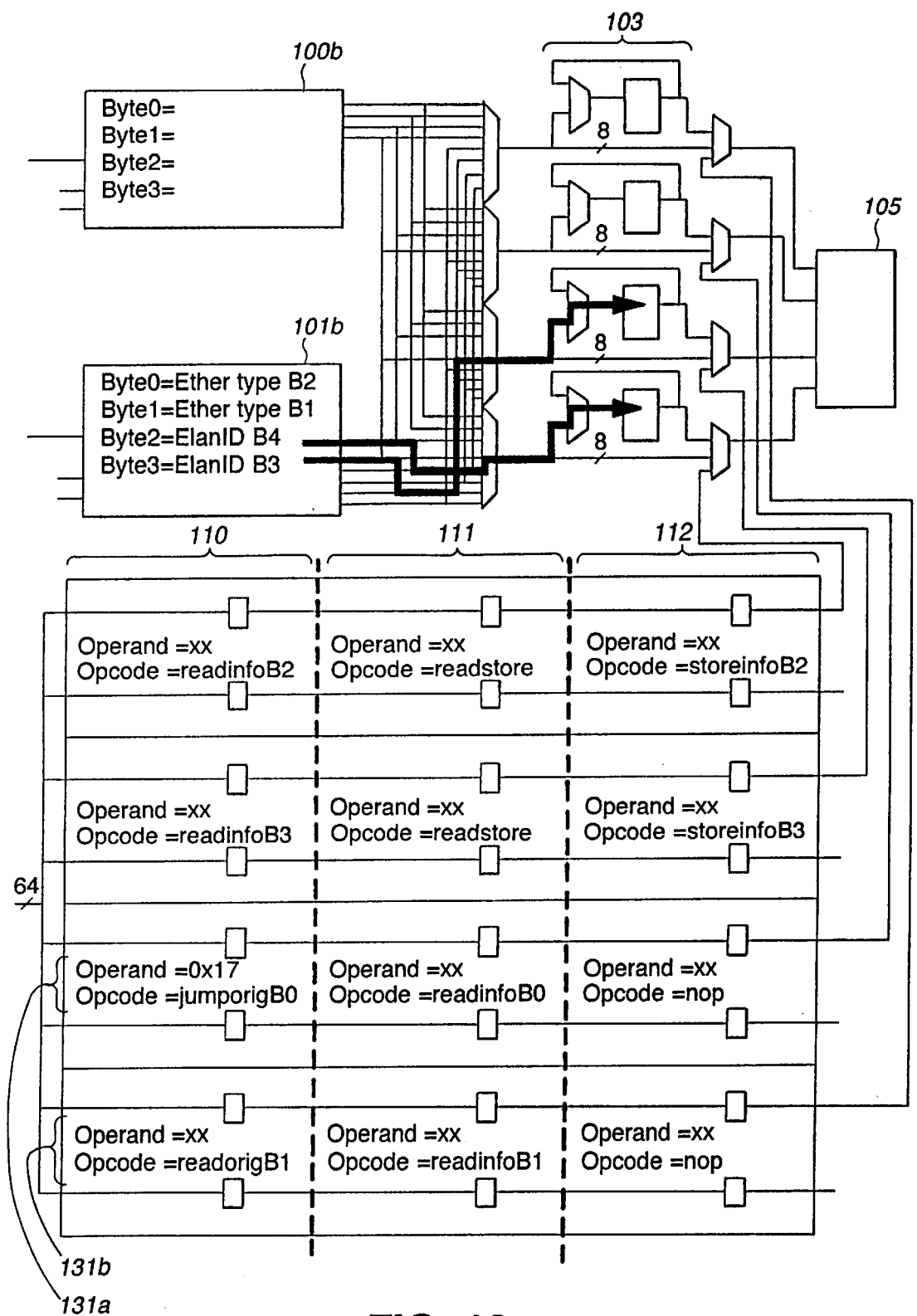
FIG. 13 illustrates a next step in translating the packet of FIG. 7A into the packet of FIG. 7B, using the circuit of FIG. 10.

FIG. 13A illustrates the next step in the translation. At this point, the two most significant bytes for the ElanID field are stored in a four byte word in the information memory 101b, as shown. These two bytes cannot be written directly to the output memory, however, because the output memory requires a four byte word to be written. Accordingly, the two bytes of the ElanID need to be stored in the storage alignment units 103, for later writing to the output memory 105. This is done as illustrated in FIG. 13A. During this clock cycle, no information is written to the output memory. Accordingly, the output memory continues to hold the same partially translated packet of FIG. 12B.

At the step illustrated in FIG. 13A, the other two pipelines hold two instructions that require reading of information from the input memory 100b—jump orig B0 at 131a (which causes the input memory 100b to jump to an operand address—to cause the address controller (not shown) of the input memory 100b to skip over the portions of the original packet header that are not used in the translated packet, i.e., fields 71, 72 of FIG. 7A). By changing the address of the input memory 100b, the next portion of the header to be read can be moved to an address that skips (deletes) fields 71, 72 of FIG. 7A (deletes the VDA, VSA and TAG type fields). In this particular embodiment, the read latency of the input memory 110b is longer than the read latency of the information memory 101b. When instructions involving reading of the input memory 100b reach the first stage 110 of the pipeline unit (at 131a and 131b), the control unit (not shown) causes the input memory's address control unit 100a to apply the applicable address and initiates a read of the input memory 100b.

Figure 14A:
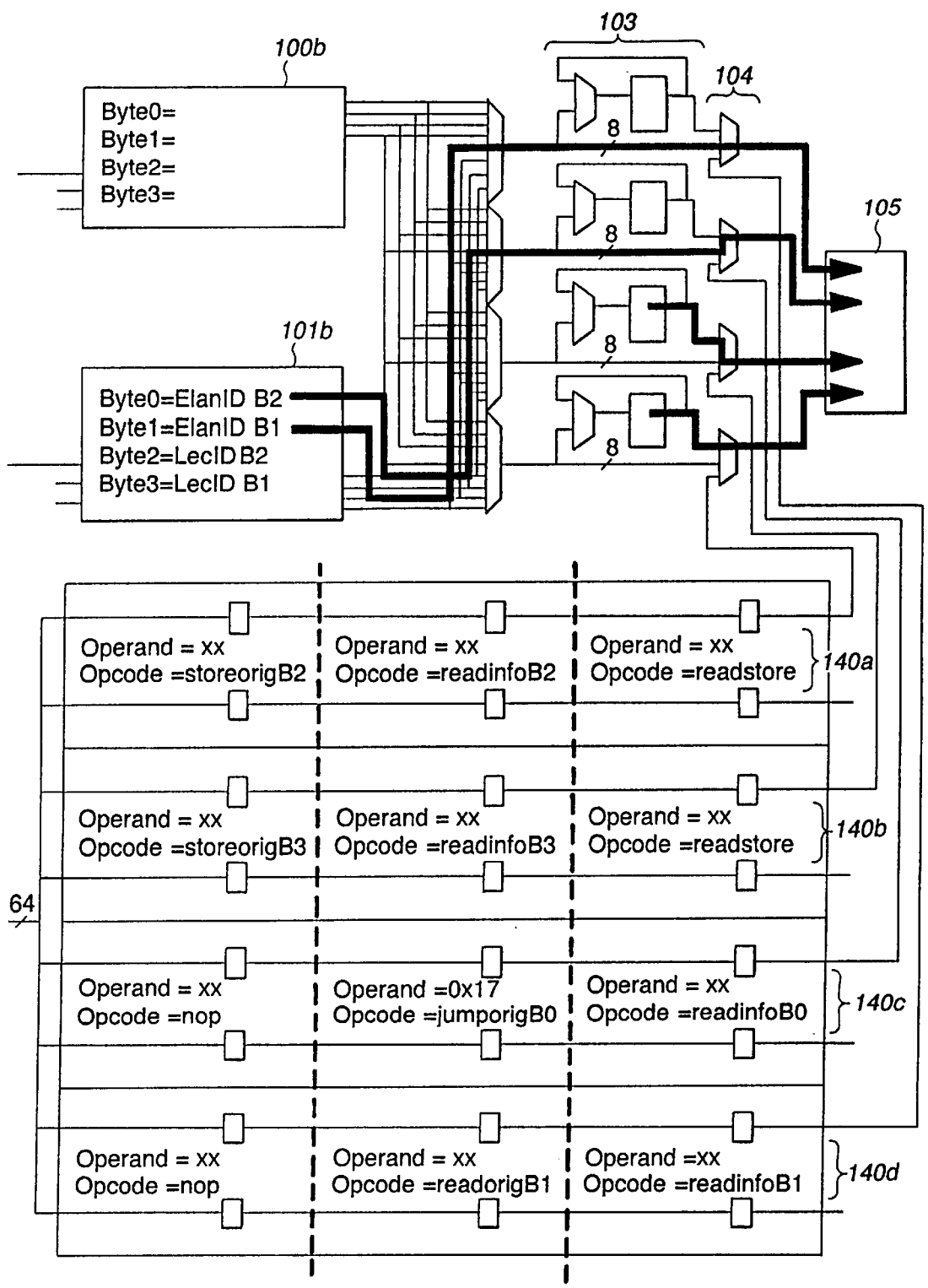
FIG. 14A illustrates a next step in translating the packet of FIG. 7A into the packet of FIG. 7B, using the circuit of FIG. 10.

FIG. 14A illustrate the next clock cycle in this translation. At this step, the remainder of the ElanID field is present at bytes 0 and 1 of the information memory 101b. Accordingly, these bytes may be written from the information memory 101b to the output memory, as is accomplished with instructions 140c and 140d. These instructions cause the top two multiplexers of the multiplexers 104 to pass the data from bytes 0 and byte 1 of the information memory 101b to the output memory 105. At the same time, instructions causing data to be written from the bottom two storage elements of the storage elements 103 to be simultaneously written to the output memory 105 (i.e., the instructions 140a and 140b) reach the last stage of the pipeline. Thus, by storing the first two bytes of the ElanID field and the storage alignment units, the last two bytes of the ElanID can be appropriately aligned with the first two bytes for simultaneous writing to the output memory 105.

Figure 14B:
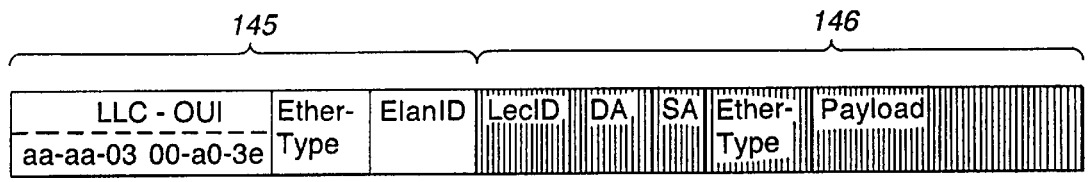
FIG. 14B illustrates the partial results after the step illustrated in FIG. 14A.

FIG. 14B illustrates the portion of the packets stored in the output memory 105, after the step illustrated in FIG. 14A. As is shown, the beginning of the packet through the ElanID field is included 145. The remainder of the packet 146 remains to be placed into the output memory. (Note, however, that if DMA control is used to transfer the payload to the output memory, a portion of the payload may also be in the output memory at this point and, perhaps, earlier.)

Figure 15B:
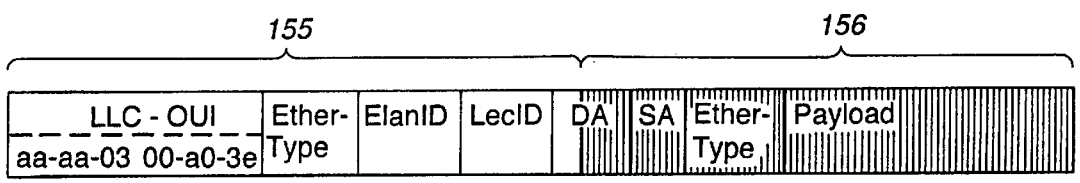
FIG. 15B illustrates the partial results in translating the packet after the step illustrated in FIG. 15A.
Figure 15A:
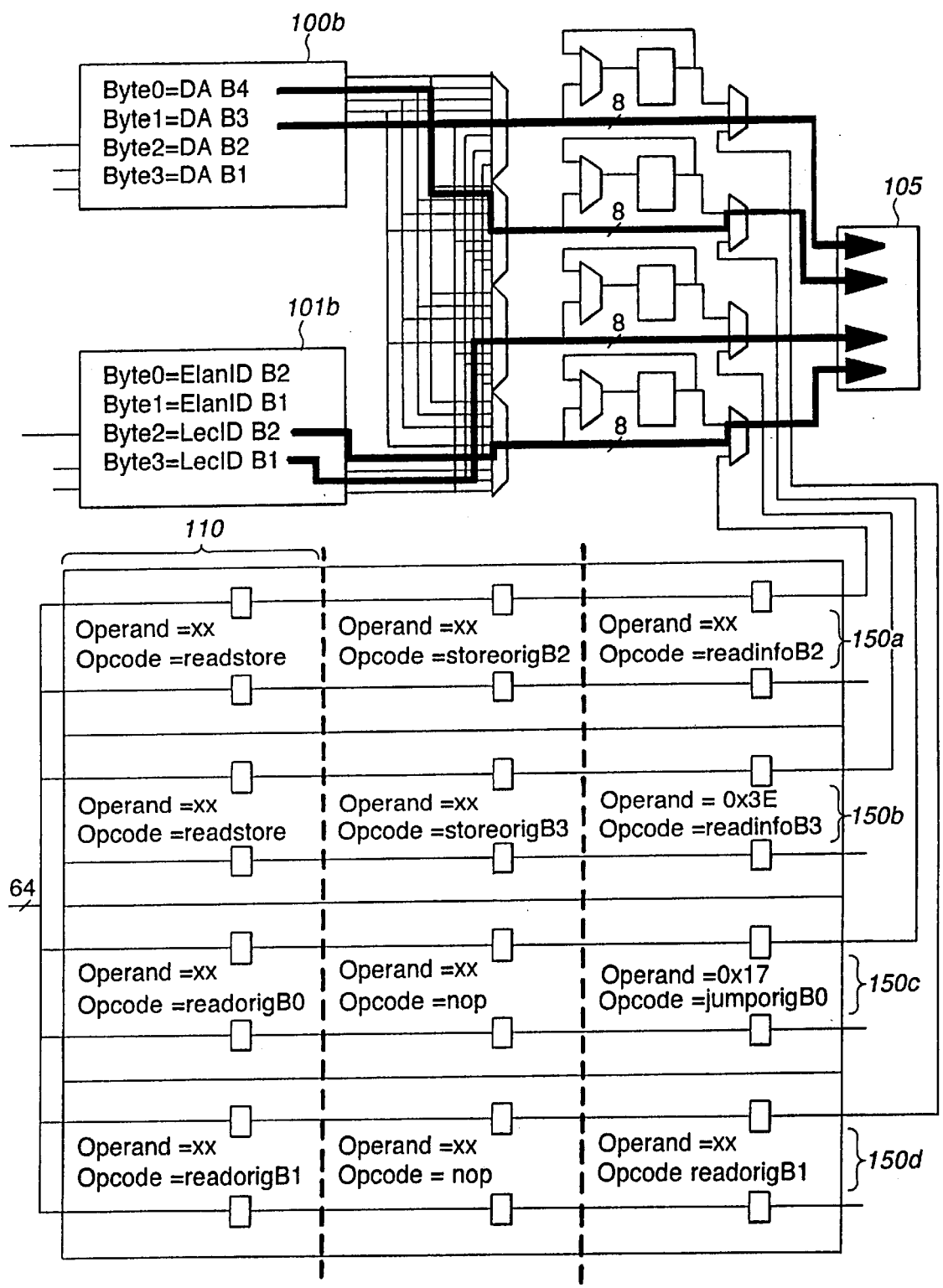
FIG. 15A illustrates a next step in translating a packet of FIG. 7A into the packet of FIG. 7B, using the circuit of FIG. 10.

FIG. 15A illustrates the next clock cycle. During this clock cycle, the first two bytes of the destination address are written to the output memory from the input memory, per the instructions at 150c and 150d. As discussed above, the read from this memory was initiated back when these instructions appeared in the first stage of the pipeline 110. At the same time, two instructions 150a and 150b cause the two bytes of the LecID to be written to the output memory from the information memory.

FIG. 15B illustrates the contents of the output memory 105 after the step illustrated in FIG. 15A. Most of the header has been written 155, including a portion of the destination address (transferred directly from the equivalent field of the original packet). The remainder of the packet 156 is yet to be written to the output memory.

Returning to FIG. 15A, the instructions to transfer the remainder of the header of the original packet header to the translated packet in the output memory are shown (the DA, SA and Ether-type fields that remain to be written are all transferred directly from the equivalent fields held in the input memory 100b). As can be seen from the instructions in the pipeline, the information is transferred using the storage alignment units, in the manner described above.

Pipelines with three stages and having a width of 1, 2 and 4 pipelines have been described. Pipelines of varying numbers of stages and varying widths can be constructed. Moreover, the example opcodes are illustrative only. Any number of other byte manipulations could be implemented. Finally, because the translator circuit structure may be built from common components, circuit design lends itself to automated procedures, including automated circuit design and optimization.

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A translator unit comprising:
   an input memory;
   at least one information source;
   an output memory;
   a connection circuit, coupled to the input memory, the information source and the output memory, to selec-
   tively connect the input memory and the information source to the output memory; and
   a microcoded control unit coupled to the connection circuit to control translation of a first packet formatted according to a first protocol having a first header format into a second packet according to a second protocol having a second header format different from the first header format.

2. The translator unit of claim 1, wherein the information source is selected from the group consisting of a register, a FIFO memory, a random access memory and an opcode memory storing data as operands of microcoded instructions.

3. The translator unit of claim 1, wherein the microcoded control unit includes a pipeline unit.

4. The translator unit of claim 1, wherein the microcoded control unit includes two pipeline units.

5. The translator unit of claim 4, wherein:
   the output memory includes at least two inputs to simultaneously write at least two bytes of data into the output memory; and
   the connection circuit includes means for aligning the two bytes of data to be simultaneously written into the output memory.

6. The translator unit of claim 1, wherein the microcoded control unit includes four pipeline units.

7. The translator unit of claim 6, wherein:
   the output memory includes at least four inputs to simultaneously write at least four bytes of data into the output memory; and
   the connection circuit includes means for aligning the four bytes of data to be simultaneously written into the output memory.

8. The translator unit of claim 1, further comprising a direct memory access controller coupled to the input memory and the output memory.

9. The translator unit of claim 1, wherein the microcoded control unit includes an opcode memory programmed to perform multiple different protocol translations.

10. A method of translating an original packet from a first protocol to a second protocol, comprising steps of:
    loading a first memory with a plurality of sets of microcode instructions, each set being designed to perform a different network communication protocol translation;
    receiving the original packet;
    selecting one of the sets of microcode instructions; and
    translating the original packet into a translated packet by executing the selected set of microcode instructions.

11. The method of claim 10, wherein the translating step includes a step of feeding the microcode instructions through a pipeline.

12. A method of translating an original packet into a translated packet, comprising steps of:
    loading an instruction memory with a set of microcoded instructions;
    loading at least a header portion of the original packet into an input memory, the input memory having a first read latency;
    providing an information source;
    providing an output memory to store the translated packet; and
    sequentially, selectively connecting the input memory and the information source to the output memory, based on the instructions.

13. The method of claim 12, wherein the connecting step comprises a step of feeding the instructions through a pipeline unit.

14. The method of claim 13, wherein:

the pipeline unit has a plurality of stages;

the set of instructions includes a first instruction to read information from the input memory and write the information to the output memory, and a second instruction to read information from the information source and write the information to the output memory; and the connecting step comprises steps of initiating reads from the input memory when the first instruction is at one of the pipeline stages selected based on the first read latency; and initiating reads from the information source when the second instruction is at a one of the pipeline stages selected based on a read latency of the information source.

15. The method of claim 14, wherein the connecting step comprises a step of connecting the input memory to the output memory when the first instruction reaches one of the pipeline stages after the pipeline stage where the first instruction initiated reading of the input memory.

16. The method of claim 12, further comprising a step of transferring a payload portion of the original packet from the input memory to the output memory using a direct memory access controller.

17. The method of claim 12, wherein:

the connecting step includes a step of connecting a plurality of data channels to the output memory.

18. The method of claim 17, further comprising a step of storing data in an alignment storage unit to align data on the data channels to be simultaneously written to the output memory.

* * * * *